United States Patent
Bretmersky et al.

(10) Patent No.: US 7,109,669 B2
(45) Date of Patent: Sep. 19, 2006

(54) MICROWAVE LAMP POWER SUPPLY THAT CAN WITHSTAND FAILURE IN HIGH VOLTAGE CIRCUIT

(75) Inventors: Carl Bretmersky, Olmsted, OH (US); James W. Schmitkons, Lorain, OH (US); Jay Wolf, Avon, OH (US)

(73) Assignee: Nordson Corporation, Westlake, OH (US)

( * ) Notice: Subject to any disclaimer, the term of this patent is extended or adjusted under 35 U.S.C. 154(b) by 117 days.

(21) Appl. No.: 10/820,254

(22) Filed: Apr. 8, 2004

(65) Prior Publication Data

US 2005/0225258 A1    Oct. 13, 2005

(51) Int. Cl.
*H05B 41/36* (2006.01)
*H05B 6/68* (2006.01)

(52) U.S. Cl. ..................... 315/308; 219/716
(58) Field of Classification Search ........ 315/307–308, 315/39.51, 223, 106, 224; 363/17; 219/121, 219/716–718
See application file for complete search history.

(56) References Cited

U.S. PATENT DOCUMENTS

| | | | | |
|---|---|---|---|---|
| 4,920,246 A | * | 4/1990 | Aoki | 219/716 |
| 5,053,682 A | * | 10/1991 | Shoda et al. | 315/223 |
| 5,115,168 A | * | 5/1992 | Shoda et al. | 315/223 |
| 5,571,439 A | * | 11/1996 | Daley et al. | 219/716 |
| 5,642,268 A | * | 6/1997 | Pratt et al. | 363/17 |
| 6,028,415 A | * | 2/2000 | Nagai et al. | 320/162 |
| 6,204,601 B1 | * | 3/2001 | Lidstrom et al. | 315/39.51 |
| 6,265,830 B1 | * | 7/2001 | Bretmersky et al. | 315/106 |
| 6,323,601 B1 | | 11/2001 | Klein et al. | |
| 6,388,226 B1 | * | 5/2002 | Smith et al. | 219/121.57 |
| 6,552,296 B1 | * | 4/2003 | Smith et al. | 219/121.43 |
| 6,559,460 B1 | | 5/2003 | Keogh et al. | |
| 2002/0050575 A1 | | 5/2002 | Keogh et al. | |
| 2004/0021428 A1 | | 2/2004 | Swami et al. | |

FOREIGN PATENT DOCUMENTS

JP          61032339          *    2/1986

* cited by examiner

*Primary Examiner*—Don Wong
*Assistant Examiner*—Hung Tran Vy
(74) *Attorney, Agent, or Firm*—Wood, Herron & Evans, L.L.P.

(57) ABSTRACT

A radiation generating system for treating a coating on a substrate. A high voltage circuit provides power to a microwave generator that, in turn, supplies microwave radiation to drive a lamp. A current limiting device is connected between the high voltage circuit and the microwave generator, and a fault detector is connected to the high voltage circuit for providing an error signal in response to excess current being supplied to the microwave generator. A control is operative to interrupt a supply of AC power to the high voltage circuit in response to the error signal.

11 Claims, 2 Drawing Sheets

Figure 1:
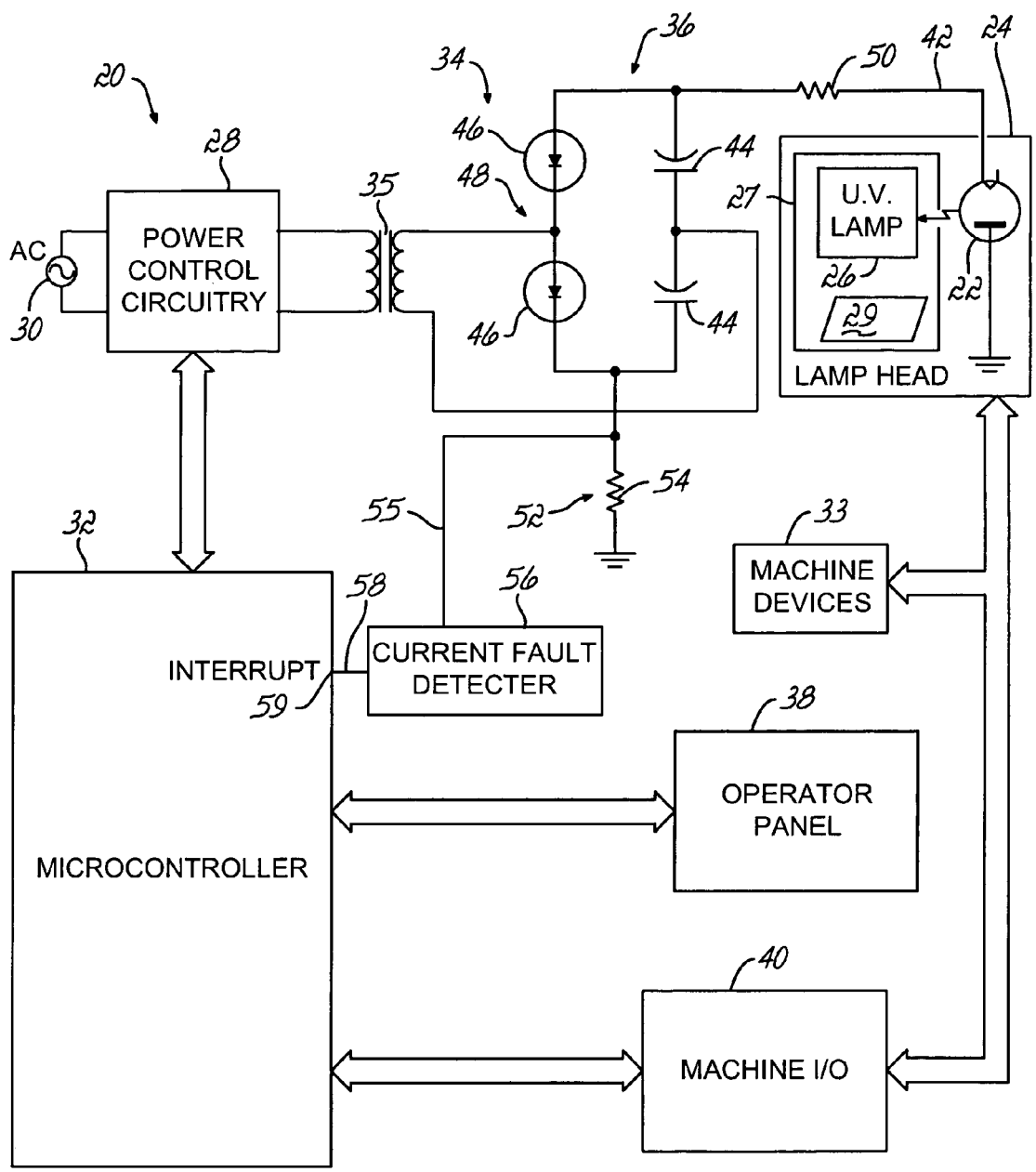

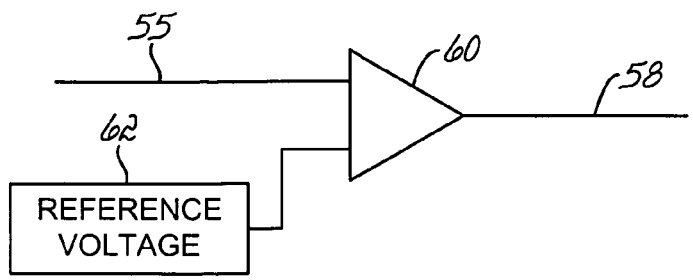
FIG. 2
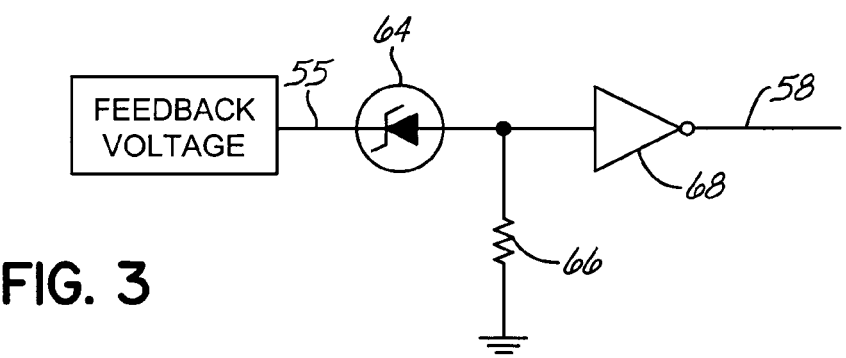
FIG. 3
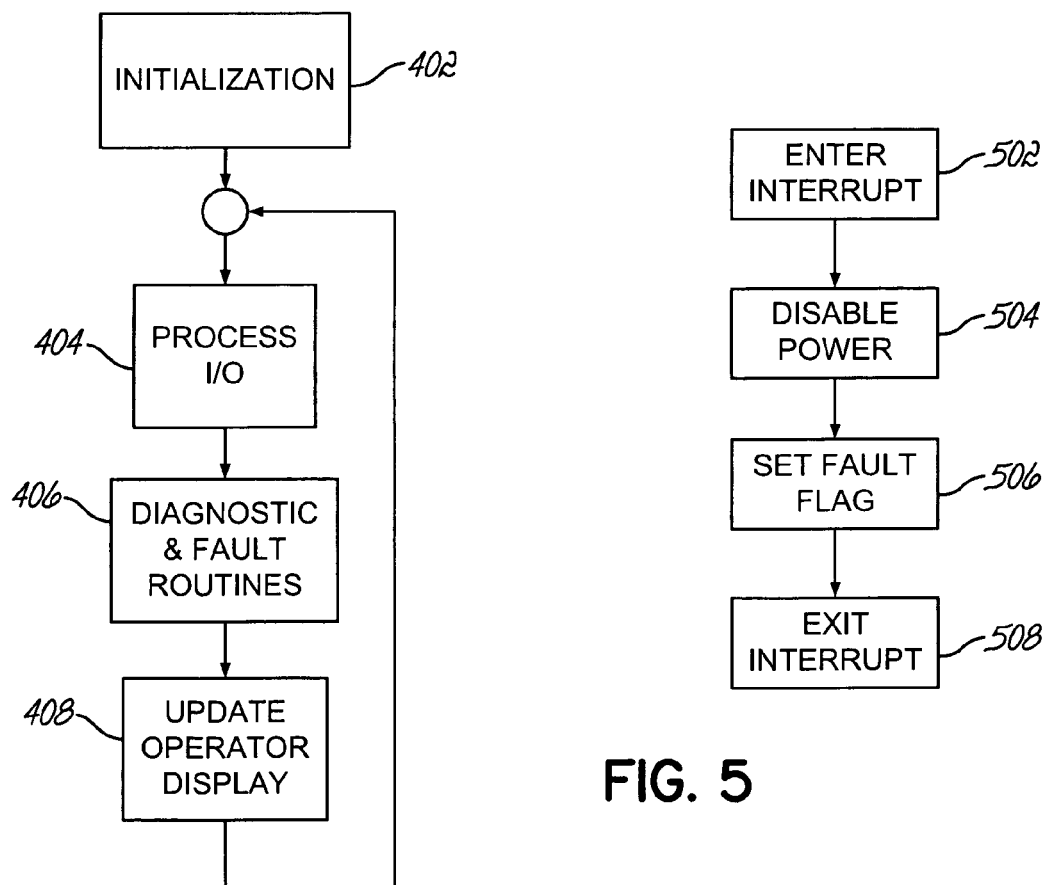
FIG. 4
FIG. 5

MICROWAVE LAMP POWER SUPPLY THAT CAN WITHSTAND FAILURE IN HIGH VOLTAGE CIRCUIT

FIELD OF THE INVENTION

The present invention relates generally to power supplies and, more particularly, to a microwave generator power supply having a failure tolerant high voltage circuit.

BACKGROUND OF THE INVENTION

In lamp heating and curing of adhesives, sealants or coatings in industrial applications, one or more microwave generators, for example, magnetrons, are used to provide microwave radiation to a lamp source, such as an electrodeless ultraviolet (UV) lamp. When the plasma of the lamp is sufficiently excited by the microwave radiation from each magnetron, the lamp illuminates to provide the necessary light wavelength and intensity for the particular heating or curing process.

Microwave-excited lamp power supply systems often have one or more high voltage power supplies that provide higher voltages to one or more magnetrons and low voltage power supplies that provide a lower voltage to a blower, a magnetron filament and other devices. The power supply system is often electrically coupled to sensors positioned within the system and the lamp head. It has been observed that as a magnetron ages and approaches the end of its useful life, there is a higher probability of the magnetron experiencing short circuits that result in high voltage arcing. Further, on occasion, the high voltage circuit components associated with the magnetron can experience a short circuit. In either event, any such short circuits can cause components associated with the high voltage power supply to experience either a life shortening stress or destruction.

Therefore, there is a need to provide apparatus and methods of detecting short circuit conditions in an output circuit of a high voltage power supply driving a microwave generator and minimizing or eliminating any harmful effects and damage.

SUMMARY OF THE INVENTION

The present invention provides an improved high voltage power supply circuit for a microwave generator that minimizes and in most applications, eliminates, damage to power supply components that would otherwise occur from short circuits in an output circuit of the high voltage power supply.

According to the principles of the present invention and in accordance with the described embodiments, the invention provides a radiation generating system for treating a coating on a substrate. A high voltage circuit provides power to a microwave generator that, in turn, generates microwave radiation to drive a lamp. A current limiting device is connected between the high voltage circuit and the microwave generator, and a fault detector is connected to the high voltage circuit for providing an error signal in response to excessive current being supplied to the microwave generator. A control is operative to interrupt a supply of AC power to the high voltage circuit in response to the error signal.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a schematic block diagram of a power supply system that has fault detection in a high voltage power supply supplying power to a microwave generator in accordance with the principles of the present invention.

FIG. 2 is a schematic diagram of one embodiment of a current fault detector in the high voltage power supply of FIG. 1.

FIG. 3 is a schematic diagram of another embodiment of a current fault detector in the high voltage power supply of FIG. 1.

FIG. 4 is a flow chart illustrating an operating cycle of the power supply system of FIG. 1.

FIG. 5 is a flow chart illustrating an interrupt cycle of the power supply system of FIG. 1.

DETAILED DESCRIPTION OF THE INVENTION

Referring to FIG. 1, a power supply system 20 is operative to supply a high voltage to a microwave generator, for example, a magnetron, 22 mounted within a lamp head 24. Microwave radiation from the magnetron 22 is coupled to a lamp 26, for example, an electrodeless ultraviolet (UV) light source, mounted within a processing space 27 of the lamp head 24. When the plasma of the lamp 26 is sufficiently excited by microwave radiation from the magnetron 22, the lamp 26 illuminates and provides a light wavelength and intensity within a processing space 27 of the lamp head 24. Thus, the lamp head 24 may be used in industrial applications to heat and/or cure adhesives, sealants, coatings, etc., on a substrate 29 located in the processing space 27 in a known manner. The power supply system 20 and lamp head 24 may be used for other heating or curing processes that requires light of a particular wavelength and intensity to achieve the desired heating and/or curing result.

The power supply system 20 has power control circuitry 28 that is connected to a source of AC power 30. The power control circuitry 28 includes power switch contacts, a line filter, one or more phase controllers, transformers, etc., to provide desired voltages to a microcontroller 32 and other machine devices 33 in a known manner. A phase-controllable voltage is provided from the power control circuitry 28 to a high voltage power supply 34 comprised of a high voltage transformer 35 and a full wave voltage doubler 36. The high voltage transformer 35 has a primary side connectable to the AC power 30 via the power control circuitry 28 and a secondary side connected to the voltage doubler 36 that provides a desired high voltage to the magnetron 22. An operator panel 38 is also connected to the microcontroller 32 and contains input/output devices, for example, pushbuttons, switches, lights, and/or a display, etc., that allow an operator to initiate and/or determine various operating states of the power supply system 20. Further, machine I/O 40 is connected to the controller 32 and is operative to receive input signals from, and provide output signals to, the lamp head 24 and machine devices 22 in a known manner. For example, input signals may be received from switches, light detectors, pressure sensors, etc.; and output signals may be provided to cooling fans, a starter bulb, lights, etc., located remote from the operator panel 28.

On occasion, a high voltage cable 42 connected to the magnetron 22 may experience a short circuit. It is also probable that during its life, the magnetron 22 will experience short circuiting arcing. All short circuits result in a charge and discharge of the capacitors 44 every half cycle and thus, very high current spikes in the voltage doubler 36, which can either damage or destroy the capacitors 44 and diodes 46 within the high voltage bridge assembly 48. Further, continued occurrences of such short circuit currents can cause further deterioration of the high voltage cable 42 as well as other components.

The power supply system 20 includes elements to minimize and/or eliminate any harmful effects and damage caused by faults within the load circuit of the voltage doubler 36, that is, the magnetron 22, connecting cable 42, etc. First, a fault current limiting resistor 50 is placed in series between the voltage doubler 36 and the magnetron 22. The value of the resistor 50 is, for example, ten ohms, and is chosen to provide a desired current suppression without creating an undesirable heat source. In addition, a current sensor 52 is connected to the voltage doubler 36 and is implemented by a current sensing resistor 54. The resistor 54 has a value of about five ohms and provides a feedback voltage on conductor 55, which changes proportionally with current flow in the voltage doubler 36. A current fault detector 56 senses the feedback voltage from the current sensor 52; and in response to an excessive feedback voltage, the current fault detector 56 provides a current error signal over conductor 58 to a microcontroller interrupt input 59. Upon receiving the error signal from the current fault detector 56, the microcontroller 32 causes the power control circuitry 28 to immediately disconnect the high voltage transformer 35 from the AC power 30.

There are many implementations of the current fault detector 56. For example, as shown in FIG. 2, a voltage comparator 60 can be used, which has one input connected to the voltage feedback signal on conductor 55 and a second input connected to a reference voltage 62. The reference voltage magnitude is chosen such that a fault is not detected unless a substantially large current, for example, a short circuit current, is detected in the voltage doubler 36. Thus, when the magnitude of the feedback voltage on conductor 55 exceeds the reference voltage 62, a current error signal is provided on the conductor 58 to the microcontroller interrupt input 59.

Referring to FIG. 3, in an alternative embodiment of the current fault detector 56, a zener diode 64 is connected to the feedback voltage on the conductor 55. When the feedback voltage exceeds a breakdown voltage of the zener diode 64, current flows through the zener diode 54 and a resistor 66. Thus, a voltage level is applied to a logic gate inverting buffer 68 that, in turn, is effective to change the state of the fault detector output 58 and the microcontroller interrupt input 59.

In use, referring to FIG. 1, in a known manner, a user operates a power switch (not shown) to connect the power supply system 20 to the AC power 30, which initiates execution of an operating program of FIG. 4 within the microcontroller 32. The program first, at 402, executes a power-on initialization routine. Thereafter, at 404, the microprocessor 32 reads states of input signals from the operator panel 38 and machine I/O 40; and as determined by a logic program within the microprocessor 32, the microprocessor 32 then switches the states of output signals to the lamp head 24 and machine I/O 40. The microcontroller 32 then, at 406, executes diagnostic and fault routines and, as a result thereof, updates, at 408, operator displays within the operator panel 38.

Upon the occurrence of a short circuit, the state of the interrupt input 59 of the microcontroller 32 changes to initiate an interrupt subroutine shown in FIG. 5. In response to the interrupt, the microcontroller 32, at 504, provides appropriate signals to the power supply circuitry 28, which results in the power supply system 20 immediately being disconnected from the AC power source 30. Thereafter, the microcontroller 32 sets a default flag, at 506, which initiates a current fault display or output on the operator panel 38. The microcontroller 32 then, at 508, exits the interrupt subroutine and returns to the main operating routine of FIG. 4.

While the present invention has been illustrated by a description of an embodiment, and while such embodiment has been described in considerable detail, there is no intention to restrict, or in any way limit, the scope of the appended claims to such detail. Additional advantages and modifications will readily appear to those skilled in the art. For example, in the described embodiment, a single microwave generator 22 and high voltage power supply 34 are shown and described; however, as will be appreciated, in alternative embodiments, more than one microwave generator 22 and high voltage power supply 34 may be used.

In the described embodiment, upon detecting a short circuit, the application of power to the high voltage power supply 34 is interrupted by the power control circuitry 28, thereby turning the power supply off. As will be appreciated, in alternative embodiments, the short circuit signal can be used to open relay contacts between high voltage power supply and the microwave generator 22. Alternatively, the relay contacts can be placed between the transformer 35 and the voltage doubler 48. Thus, there are several alternative embodiments for removing the high voltage from the microwave generator 22.

Therefore, the invention in its broadest aspects is not limited to the specific details shown and described. Consequently, departures may be made from the details described herein without departing from the spirit and scope of the claims which follow.

What is claimed is:

1. A radiation generating system for treating a coating on a substrate, comprising:
    a microwave generator operable to generate microwave radiation;
    a lamp associated with said microwave generator for receiving microwave radiation therefrom;
    a high voltage power supply adapted to be connected to an AC power source and providing high voltage power to said microwave generator;
    a current limiting device connected between said high voltage power supply and said microwave generator and adapted to limit a short circuit current being supplied to said microwave generator;
    a fault detector connected to said high voltage power supoly and operating independent of said current limiting device to provide an error signal in response to detecting the short circuit current being supplied to said microwave generator; and
    a control operative to disconnect said AC power source from said high voltage power supply in response to said error signal.

2. The radiation generating system of claim 1 wherein said current limiting device comprises a current limiting resistance.

3. The radiation generating system of claim 1 wherein said fault detector comprises:
   a current sensor; and
   a fault circuit connected to said current sensor and producing said error signal.

4. The radiation generating system of claim 3 wherein said fault circuit produces said error signal in response to said feedback voltage exceeding a voltage limit.

5. The radiation generating system of claim 3 wherein said fault circuit comprises a comparator comprising:
   one input connected to said feedback voltage, and
   a second input connected to a voltage reference.

6. The radiation generating system of claim 3 wherein said fault circuit comprises a zener diode.

7. The radiation generating system of claim 1 wherein said high voltage power supply comprises
      a high voltage transformer having a primary side adapted to be coupled to an AC voltage source and a secondary side providing high voltage power, and
      a voltage doubler connected to said secondary side of said high voltage transformer;
   said current limiting device comprises a current limiting resistance connected between said voltage doubler and said microwave generator, and
   said fault detector comprises a current sensor and a fault circuit connected to said current sensor and producing said error signal.

8. The radiation generating system of claim 7 wherein said current sensor produces a feedback voltage having a magnitude changing with changes in current in said voltage doubler.

9. A method of preventing a high voltage power supply from providing a short circuit current to a microwave generator driving a lamp for treating a coating on a substrate, the method comprising:
   applying high voltage power to the microwave generator;
   limiting a short circuit current supplied to the microwave generator using a current limiting device connected between the high voltage power supply and the microwave generator;
   detecting the short circuit current supplied to the microwave generator using a fault detector independent of the current limiting device;
   providing an error signal in response to detecting the short circuit current being supplied by the high voltage power supply to the microwave generator; and
   disconnecting the high voltage power from an AC voltage source in response to the error signal, thereby disconnecting power from the microwave generator in response to the error signal.

10. The method of claim 9 wherein the current limiting device comprises a current limiting resistance connected between the high voltage power supply and the microwave generator.

11. The method of claim 10 wherein providing an error signal comprises:
   producing a feedback voltage having a magnitude changing with changes in the current supplied to the microwave generator; and
   producing the error signal in response to the feedback voltage exceeding a voltage limit.

* * * * *